United States Patent
Lan et al.

(10) Patent No.: US 12,255,533 B2
(45) Date of Patent: Mar. 18, 2025

(54) POWER CONVERTER WITH LOADING DETECTOR FOR ENHANCING CONVERSION EFFICIENCY

(71) Applicant: NOVATEK MICROELECTRONICS CORP., Hsinchu County (TW)

(72) Inventors: Yi-Meng Lan, Tainan (TW); Yung-Chou Lin, Kaohsiung (TW); Tuo-Kuang Chen, Hsinchu (TW); Chih-Yang Kang, Baoshan Township, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 224 days.

(21) Appl. No.: 17/895,046

(22) Filed: Aug. 24, 2022

(65) Prior Publication Data

US 2024/0072669 A1 Feb. 29, 2024

(51) Int. Cl.
| | |
|---|---|
| *H02M 3/158* | (2006.01) |
| *H02M 1/00* | (2007.01) |
| *H02M 1/08* | (2006.01) |
| *H02M 3/156* | (2006.01) |

(52) U.S. Cl.
CPC ......... *H02M 3/158* (2013.01); *H02M 1/0006* (2021.05); *H02M 1/0032* (2021.05); *H02M 1/08* (2013.01); *H02M 3/1566* (2021.05)

(58) Field of Classification Search
CPC ...... H02M 1/08; H02M 1/088; H02M 1/0032; H03K 19/0016; H03K 2217/0072
See application file for complete search history.

(56) References Cited

U.S. PATENT DOCUMENTS

| | | | | |
|---|---|---|---|---|
| 6,744,649 B1* | 6/2004 | Yang | ................... | H02M 3/3376 |
| | | | | 363/41 |
| 2006/0132179 A1* | 6/2006 | Kim | ................... | H04L 25/0292 |
| | | | | 326/82 |
| 2008/0007241 A1* | 1/2008 | Isham | ..................... | H02M 1/08 |
| | | | | 323/285 |
| 2010/0013452 A1* | 1/2010 | Tang | ..................... | H02M 3/156 |
| | | | | 323/282 |
| 2016/0065072 A1* | 3/2016 | Xiu | ......................... | H02M 1/08 |
| | | | | 323/271 |
| 2017/0302178 A1 | 10/2017 | Bandyopadhyay et al. | | |

(Continued)

FOREIGN PATENT DOCUMENTS

TW 202143611 11/2021

OTHER PUBLICATIONS

"Office Action of Taiwan Counterpart Application", issued on Jan. 31, 2023, p. 1-p. 7.

*Primary Examiner* — Gustavo A Rosario-Benitez
(74) *Attorney, Agent, or Firm* — JCIPRNET

(57) ABSTRACT

A power converter includes a high side switch, a low side switch, a low side driver, a loading detector, a configurable regulator and a high side driver. The low side driver generates a low side drive signal to control the low side switch. The configurable regulator generates a regulation voltage, a magnitude of which is greater when the loading detector detects that the power converter has light loading than when the loading detector detects that the power converter has heavy loading. The high side driver generates a high side drive signal that switches between the input voltage and the regulation voltage to control the high side switch.

7 Claims, 5 Drawing Sheets

(56) References Cited

U.S. PATENT DOCUMENTS

| | | | | |
|---|---|---|---|---|
| 2017/0358984 | A1* | 12/2017 | Unno | H02M 3/158 |
| 2019/0081549 | A1* | 3/2019 | Lee | H02M 1/088 |
| 2021/0184576 | A1* | 6/2021 | Cattani | H02M 1/08 |
| 2021/0391795 | A1* | 12/2021 | Gandhi | H02M 3/1582 |
| 2023/0198376 | A1* | 6/2023 | Abesingha | H02M 1/0048 |
| | | | | 323/282 |
| 2024/0030812 | A1* | 1/2024 | D'Souza | H02M 3/07 |

* cited by examiner

POWER CONVERTER WITH LOADING DETECTOR FOR ENHANCING CONVERSION EFFICIENCY

FIELD

The disclosure relates to a power converter, and more particularly to a power converter for performing buck-boost conversion.

BACKGROUND

Referring to FIG. 1, a conventional power converter 91 is used with an inductor 92 to perform buck-boost conversion, so as to convert an input voltage (VIN) that has a positive magnitude into an output voltage (VNEG) that has a negative magnitude and that is supplied to a load 93. The conventional power converter 91 includes a high side switch 911, a low side switch 912, a low side driver 913, a fixed regulator 914 and a high side driver 915. The low side driver 913 generates a low side drive signal (Vgn) that switches between the output voltage (VNEG) and a voltage (VA) greater than the output voltage (VNEG) in magnitude, so as to control switching of the low side switch 912 between non-conduction and conduction. The fixed regulator 15 generates a regulation voltage (Vhs_reg) that has a fixed magnitude smaller than the magnitude of the input voltage (VIN). The high side driver 915 generates a high side drive signal (Vgp) that switches between the input voltage (VIN) and the regulation voltage (Vhs_reg), so as to control switching of the high side switch 911 between non-conduction and conduction. The conventional power converter 91, when having light loading, disadvantageously has relatively large switch switching loss, relatively large heat generation and relatively low conversion efficiency.

SUMMARY

Therefore, an object of the disclosure is to provide a power converter that can alleviate at least one drawback of the prior art.

According to the disclosure, the power converter includes a high side switch, a low side switch, a low side driver, a loading detector, a configurable regulator and a high side driver. The high side switch has a first terminal that receives an input voltage, a second terminal that is adapted to be coupled to an inductor, and a control terminal that receives a high side drive signal. The low side switch has a first terminal that is coupled to the second terminal of the high side switch, a second terminal that is adapted to be coupled to a load and that provides an output voltage, and a control terminal that receives a low side drive signal. The low side driver is coupled to the control terminal of the low side switch, and generates the low side drive signal for receipt by the control terminal of the low side switch. The loading detector generates an indication output. The configurable regulator is coupled to the loading detector to receive the indication output, and generates a regulation voltage based on the indication output. The high side driver is coupled to the configurable regulator to receive the regulation voltage, is further coupled to the control terminal of the high side switch, further receives the input voltage, and generates the high side drive signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
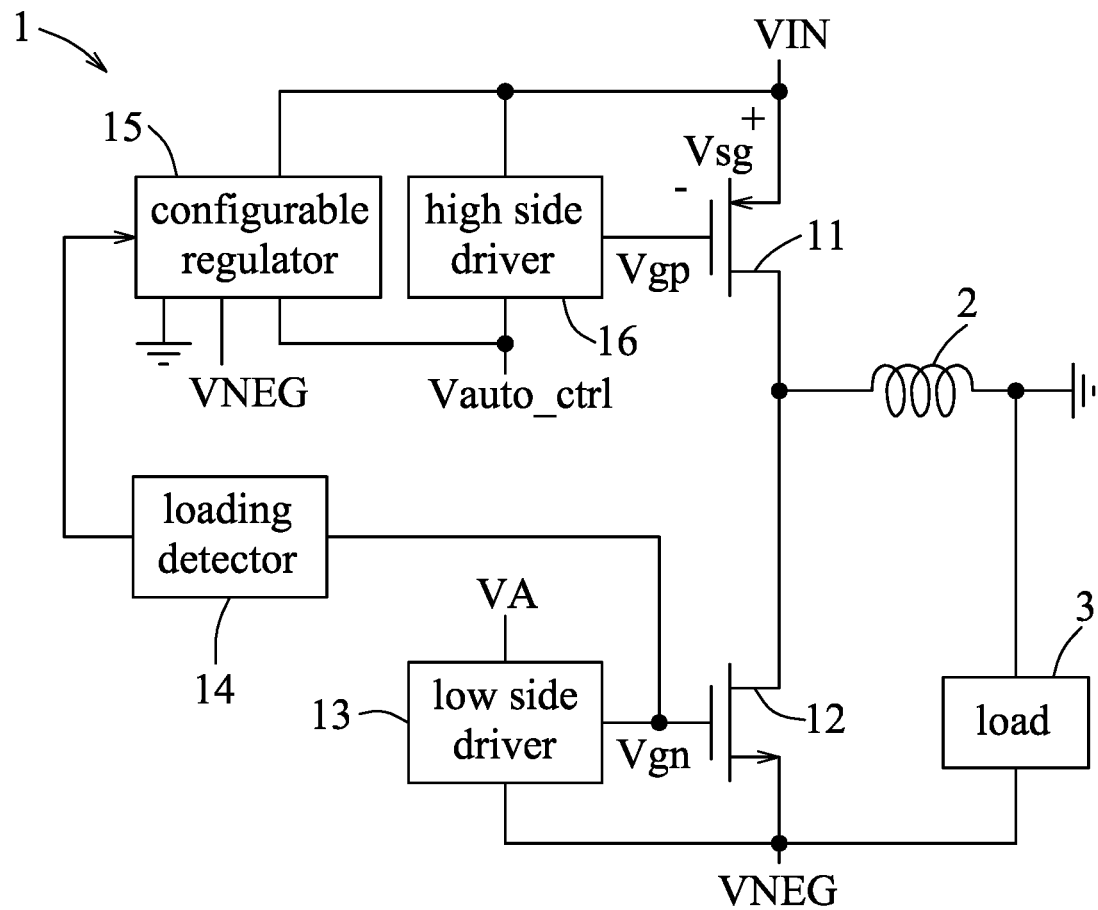
FIG. 2 is a circuit block diagram illustrating an embodiment of a power converter according to the disclosure.

Referring to FIG. 2, an embodiment of a power converter 1 according to the disclosure is used with an inductor 2 to perform buck-boost conversion, so as to convert an input voltage (VIN) that has a positive magnitude into an output voltage (VNEG) that has a negative magnitude and that is supplied to a load 3. The magnitude of the input voltage (VIN) may fall within a range of from 3 V to 5 V, and the magnitude of the output voltage (VNEG) may fall within a range of from −7 V to −4 V, but the disclosure is not limited in these respects. The power converter 1 of this embodiment may be installed in an electronic device such as a notebook computer, a computer monitor or a television set, and the output voltage (VNEG) may be supplied to at least one components of the electronic device such as a liquid crystal panel and/or a source driver for driving the liquid crystal panel, but the disclosure is not limited to these respects.

The power converter 1 of this embodiment includes a high side switch 11, a low side switch 12, a low side driver 13, a loading detector 14, a configurable regulator 15 and a high side driver 16.

The high side switch 11 (e.g., a P-type metal oxide semiconductor field effect transistor (pMOSFET)) has a first terminal (e.g., a source terminal) that receives the input voltage (VIN), a second terminal (e.g., a drain terminal) that is adapted to be coupled to the inductor 2, and a control terminal (e.g., a gate terminal) that receives a high side drive signal (Vgp). The inductor 2 is further coupled to ground. When the high side switch 11 conducts, the inductor 2 stores energy from a power supply (not shown) that provides the input voltage (VIN).

The low side switch 12 (e.g., an N-type metal oxide semiconductor field effect transistor (nMOSFET)) has a first terminal (e.g., a drain terminal) that is coupled to the second terminal of the high side switch 11, a second terminal (e.g., a source terminal) that is adapted to be coupled to the load 3 and that provides the output voltage (VNEG), and a control terminal (e.g., a gate terminal) that receives a low side drive signal (Vgn). The load 3 is further coupled to ground. When the low side switch 11 conducts, the inductor 2 releases energy stored therein to the load 3.

The low side driver 13 is coupled to the second terminal of the low side switch 12 to receive the output voltage (VNEG), is further coupled to the control terminal of the low side switch 12, and further receives a voltage (VA) that is greater than the output voltage (VNEG) in magnitude by a predetermined amount (e.g., 5 V). The low side driver 13 generates the low side drive signal (Vgn) that switches between the output voltage (VNEG) and the voltage (VA) for receipt by the control terminal of the low side switch 12, so as to control switching of the low side switch 12 between non-conduction and conduction.

The loading detector 14 detects whether the power converter 1 of this embodiment has light loading or heavy loading, so as to generate an indication output.

The configurable regulator 15 is coupled to the loading detector 14 to receive the indication output, and generates a regulation voltage (Vauto_ctrl) based on the indication output. A magnitude of the regulation voltage (Vauto_ctrl) is smaller than the magnitude of the input voltage (VIN); and when the indication output indicates that the power converter 1 of this embodiment has light loading, the magnitude of the regulation voltage (Vauto_ctrl) is greater than when the indication output indicates that the power converter 1 of this embodiment has heavy loading.

The high side driver 16 is coupled to the configurable regulator 15 to receive the regulation voltage (Vauto_ctrl), is further coupled to the control terminal of the high side switch 11, and further receives the input voltage (VIN). The high side driver 16 generates the high side drive signal (Vgp) that switches between the input voltage (VIN) and the regulation voltage (Vauto_ctrl) for receipt by the control terminal of the high side switch 11, so as to control switching of the high side switch 11 between non-conduction and conduction.

Figure 3:
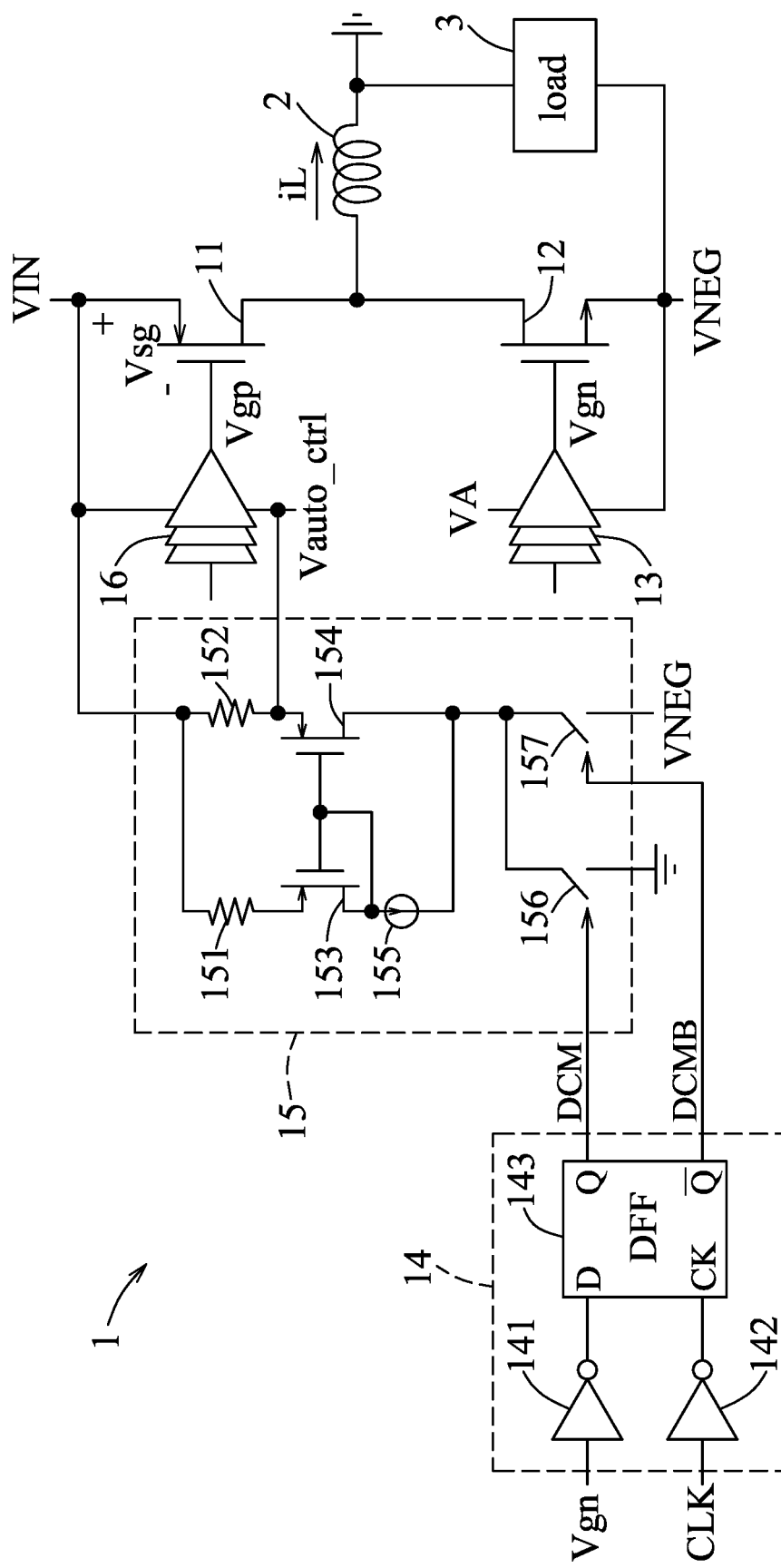
FIG. 3 is a circuit block diagram illustrating a loading detector and a configurable regulator of the embodiment.
Figure 4:
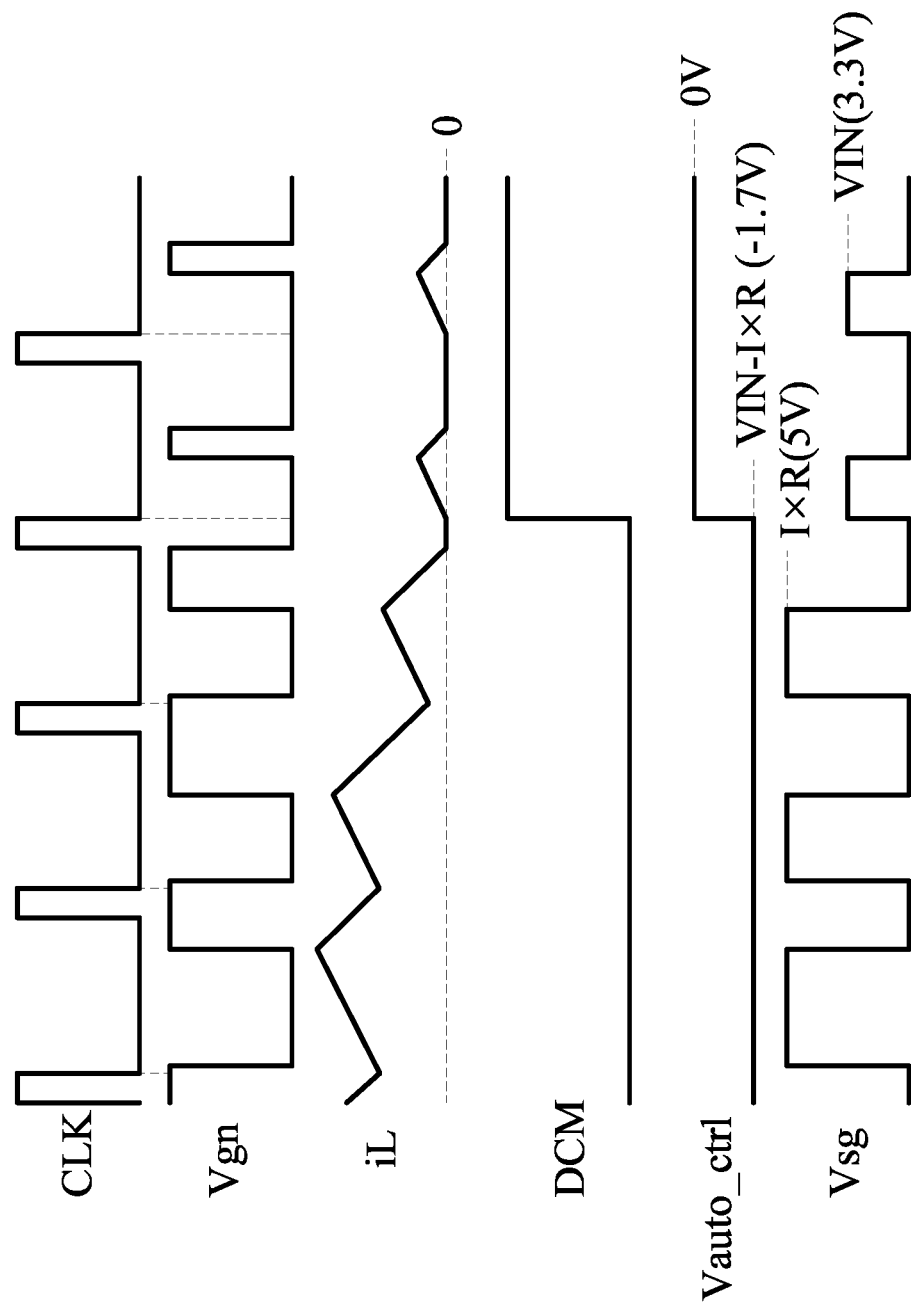
FIG. 4 is a timing diagram illustrating operations of the embodiment.

Referring to FIGS. 3 and 4, in this embodiment, each of the low side driver 13 and the high side driver 16 is a buffer. Upon each falling edge of a clock signal (CLK), the high side drive signal (Vgp) switches from the input voltage (VIN) to the regulation voltage (Vauto_ctrl), so the high side switch 11 switches from non-conduction to conduction, after which a current (iL) flowing through the inductor 2 (hereinafter referred to as the inductor current (iL)) gradually increases in magnitude. After a time interval counting from the falling edge of the clock signal (CLK), the high side drive signal (Vgp) switches from the regulation voltage (Vauto_ctrl) to the input voltage (VIN), so the high side switch 11 switches from conduction to non-conduction. The time interval is shorter than a period of the clock signal (CLK), and is shorter when the power converter 1 of this embodiment has light loading than when the power converter 1 of this embodiment has heavy loading. Upon each switching of the high side drive signal (Vgp) from the regulation voltage (Vauto_ctrl) to the input voltage (VIN), the low side drive signal (Vgn) switches from the output voltage (VNEG) to the voltage (VA), so the low side switch 12 switches from non-conduction to conduction, after which the inductor current (iL) gradually decreases in magnitude. When the power converter 1 of this embodiment has light loading, the power converter 1 operates in a discontinuous conduction mode; and upon the inductor current (iL) decreasing to reach zero magnitude, the low side drive signal (Vgn) switches from the voltage (VA) to the output voltage (VNEG), so the low side switch 12 switches from conduction to non-conduction. When the power converter 1 of this embodiment has heavy loading, the power converter 1 operates in a continuous conduction mode; and upon each falling edge of the clock signal (CLK), the low side drive signal (Vgn) switches from the voltage (VA) to the output voltage (VNEG), so the low side switch 12 switches from conduction to non-conduction.

In this embodiment, the loading detector 14 is further coupled to the low side driver 13 to receive the low side drive signal (Vgn), further receives the clock signal (CLK), and generates the indication output based on the low side drive signal (Vgn) and the clock signal (CLK). To be specific, the indication output includes an indication signal (DCM), and an inverted indication signal (DCMB) which has a logical value that is a logical complement of the indication signal (DCM); and the loading detector 14 includes a first inverter 141, a second inverter 142 and a D flip-flop 143. The first inverter 141 has an input terminal that is coupled to the low side driver 13 to receive the low side drive signal (Vgn), and an output terminal. The second inverter 142 has an input terminal that receives the clock signal (CLK), and an output terminal. The D flip-flop 143 has a data input terminal that is coupled to the output terminal of the first inverter 141, a clock input terminal that is coupled to the output terminal of the second inverter 142, a data output terminal that provides the indication signal (DCM), and an inverting data output terminal that provides the inverted indication signal (DCMB). Therefore, upon each falling edge of the clock signal (CLK), the loading detector 14 causes the indication signal (DCM) to be a logical complement of the low side drive signal (Vgn) in logic value, and causes the inverted indication signal (DCMB) to be identical to the low side drive signal (Vgn) in logic value. When the power converter 1 of this embodiment has light loading, the low side drive signal (Vgn) is at logic value "0" (which corresponds to the output voltage (VNEG)) upon the falling edges of the clock signal (CLK), so the indication signal (DCM) and the inverted indication signal (DCMB) respectively stay at logic value "1" and logic value "0". When the power converter 1 of this embodiment has heavy loading, the low side drive signal (Vgn) is at logic value "1" (which corresponds to the voltage (VA)) upon the falling edges of the clock signal (CLK), so the indication signal (DCM) and the inverted indication signal (DCMB) respectively stay at logic value "0" and logic value "1".

In this embodiment, the configurable regulator 15 is further coupled to the second terminal of the low side switch 12 to receive the output voltage (VNEG), is further coupled to a terminal to receive a reference voltage which can be a ground voltage, and further receives the input voltage (VIN). When the indication output indicates that the power converter 1 of this embodiment has light loading (i.e., the indication signal (DCM) and the inverted indication signal (DCMB) being respectively at logic value "1" and logic value "0"), the configurable regulator 15 is powered by the input voltage (VIN) with respect to the ground voltage. When the indication output indicates that the power converter 1 of this embodiment has heavy loading (i.e., the indication signal (DCM) and the inverted indication signal (DCMB) being respectively at logic value "0" and logic value "1"), the configurable regulator 15 is powered by the input voltage (VIN) with respect to the output voltage (VNEG). To be specific, the configurable regulator 15 includes a first resistor 151, a second resistor 152, a first transistor 153, a second transistor 154, a current source 155, a first switch 156 and a second switch 157. The first resistor 151 has a first terminal that receives the input voltage (VIN), and a second terminal. The second resistor 152 has a first terminal that receives the input voltage (VIN), and a second terminal. The first transistor 153 (e.g., a pMOSFET) has a first terminal (e.g., a source terminal) that is coupled to the second terminal of the first resistor 151, a second terminal (e.g., a drain terminal), and a control terminal (e.g., a gate terminal) that is coupled to the second terminal of the first transistor 153. The second transistor 154 (e.g., a pMOSFET) has a first terminal (e.g., a source terminal) that is coupled to the second terminal of the second resistor 152, a second terminal (e.g., a drain terminal), and a control terminal (e.g., a gate terminal) that is coupled to the control terminal of the first transistor 153. The current source 155 is coupled between the second terminal of the first transistor 153 and the second terminal of the second transistor 154, and generates a current that flows from the second terminal of the first transistor 153 to the second terminal of the second transistor 154. The first switch 156 has a first terminal that is coupled to the second terminal of the second transistor 154, a second terminal that is coupled to ground to receive the ground voltage, and a control terminal that is coupled to the loading detector 14 to receive the indication signal (DCM). The first switch 156 conducts when the indication signal (DCM) is at logic value "1", and does not conduct when the indication signal (DCM) is at logic value "0". The second switch 157 has a first terminal that is coupled to the second terminal of the second transistor 154, a second terminal that is coupled to the second terminal of the low side switch 12 to receive the output voltage (VNEG), and a control terminal that is coupled to the loading detector 14 to receive the inverted indication signal (DCMB). The second switch 157 conducts when the inverted indication signal (DCMB) is at logic value "1", and does not conduct when the inverted indication signal (DCMB) is at logic value "0". The regulation voltage (Vauto_ctrl) is provided at a common node of the second resistor 152 and the second transistor 154. Therefore, the regulation voltage (Vauto_ctrl) is equal to the ground voltage in magnitude (i.e., being 0 V) when the indication output indicates that the power converter 1 of this embodiment has light loading, and is smaller than the ground voltage in magnitude and greater than the output voltage (VNEG) in magnitude (i.e., the magnitude being (VIN−I×R), where "I" denotes the current generated by the current source 155, "R" denotes a resistance of the first resistor 151, and VIN<I×R<VIN−VNEG) when the indication output indicates that the power converter 1 of this embodiment has heavy loading. As shown in FIG. 4, in an example where VIN=3.3 V and I×R=5 V, VIN−I×R=−1.7 V.

Since a voltage (Vsg) between the first terminal and the control terminal of the high side switch 911 swings less when the indication output indicates that the power converter 1 of this embodiment has light loading than when the indication output indicates that the power converter 1 of this embodiment has heavy loading, switch switching loss of the power converter 1 of this embodiment can be reduced when the power converter 1 of this embodiment has light loading, thereby reducing heat generation of the power converter 1 of this embodiment and enhancing conversion efficiency of the power converter 1 of this embodiment.

Figure 1:
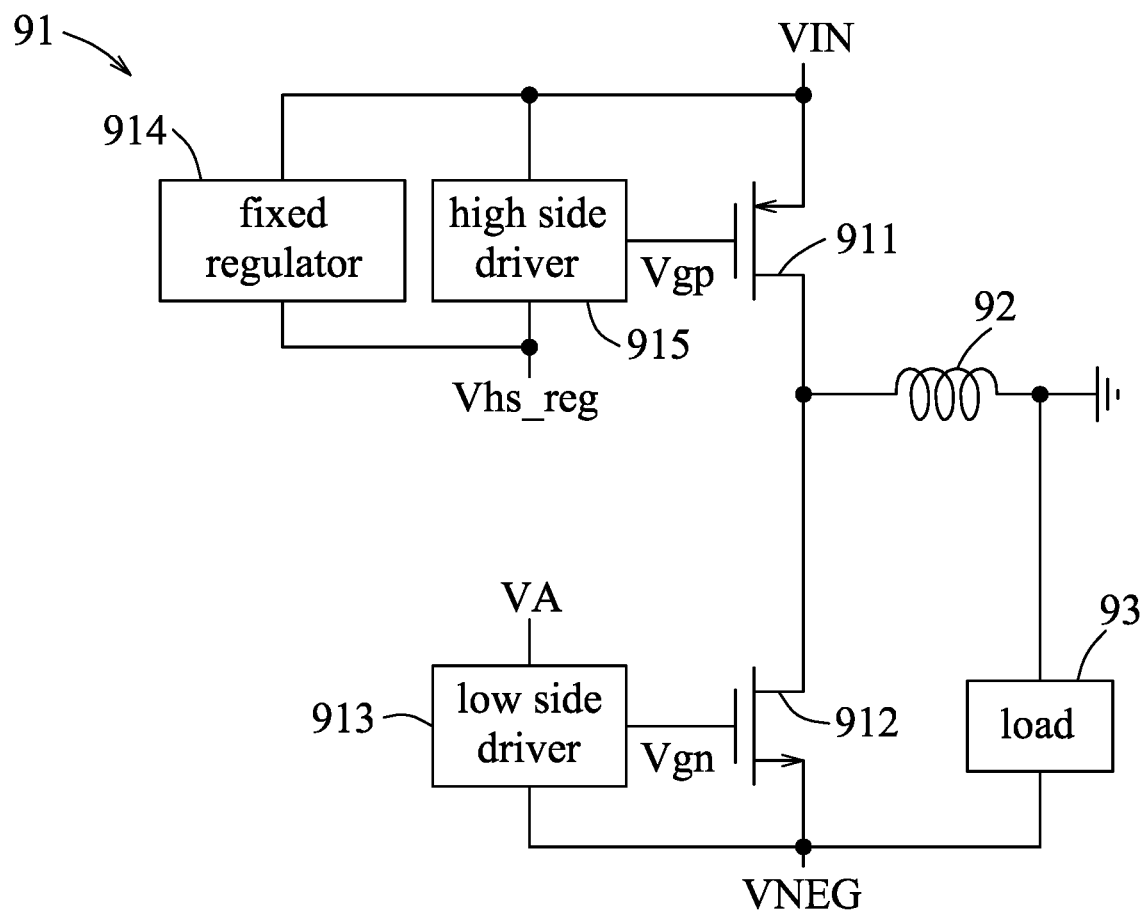
FIG. 1 is a circuit block diagram illustrating a conventional power converter.
Figure 5:
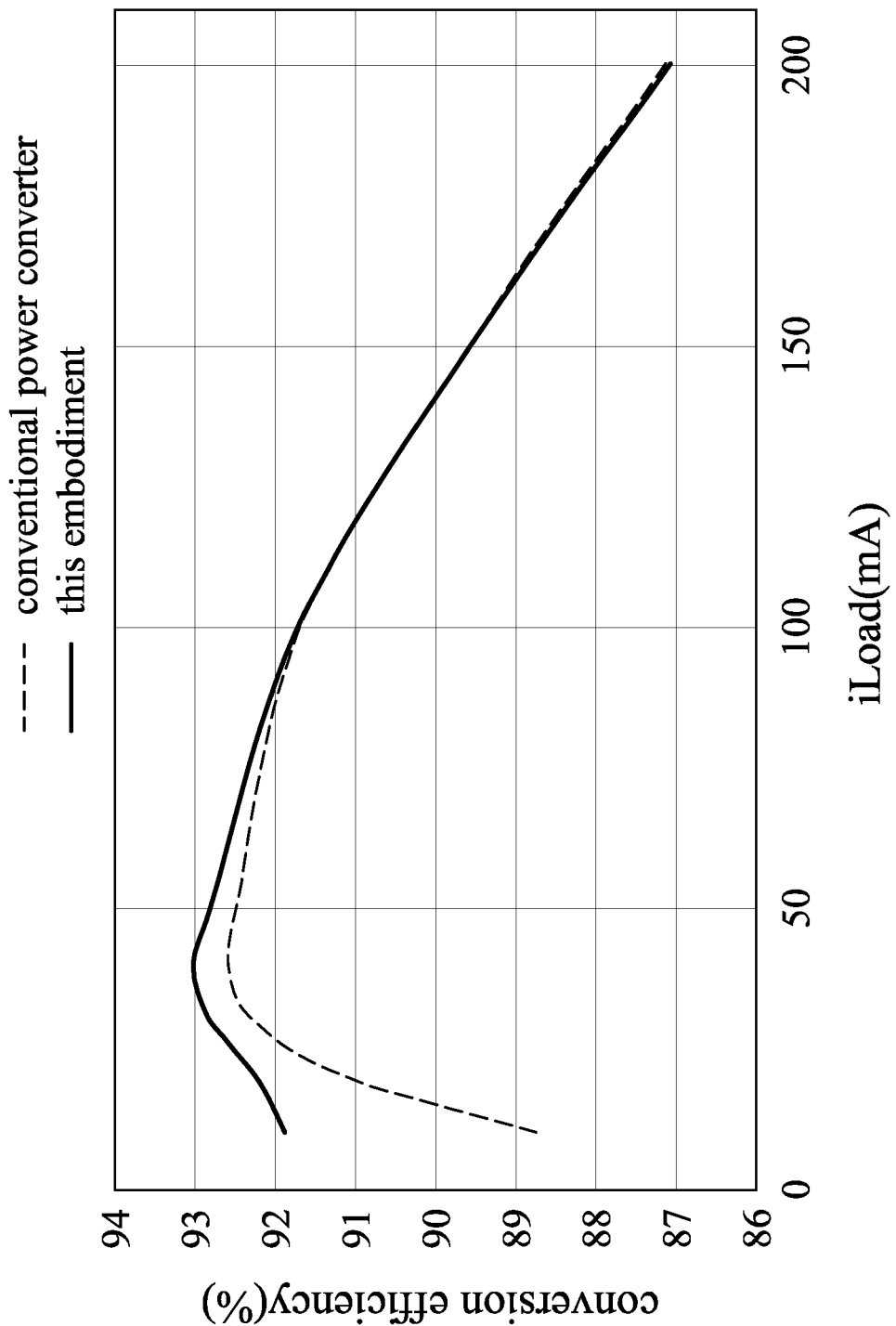
FIG. 5 is a plot illustrating conversion efficiency versus load current characteristics for the embodiment and the conventional power converter.

Referring to FIGS. 1, 3 and 5, FIG. 5 illustrates conversion efficiency versus load current characteristics for the power converter 1 of this embodiment and the conventional power converter 91, where a load current (iLoad), which is an average of the inductor current (iL) in each period of the clock signal (CLK), falls within a range of from 0 mA to 200 mA. It can be reasonably determined from FIG. 5 that the power converter 1 of this embodiment has better conversion efficiency than the conventional power converter 91 when the power converter 1 of this embodiment and the conventional power converter 91 have light loading.

In view of the above, in this embodiment, by virtue of the loading detector 14 detecting whether the power converter 1 has light loading or heavy loading to generate the indication output, and by virtue of the configurable regulator 15 causing the magnitude of the regulation voltage (Vauto_ctrl) to be greater when the indication output indicates that the power converter 1 has light loading than when the indication output indicates that the power converter 1 has heavy loading, the power converter 1, when having light loading, can have relatively small switch switching loss, relatively small heat generation and relatively high conversion efficiency as compared to the conventional power converter 91.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A power converter comprising:
a high side switch having a first terminal that receives an input voltage, a second terminal that is adapted to be coupled to an inductor, and a control terminal that receives a high side drive signal;
a low side switch having a first terminal that is coupled to said second terminal of said high side switch, a second terminal that is adapted to be coupled to a load and that provides an output voltage, and a control terminal that receives a low side drive signal;
a low side driver coupled to said control terminal of said low side switch, and generating the low side drive signal for receipt by said control terminal of said low side switch;
a loading detector receiving the low side drive signal and generating an indication output based on the low side drive signal;
a configurable regulator coupled to said loading detector to receive the indication output, and generating a regulation voltage based on the indication output; and
a high side driver coupled to said configurable regulator to receive the regulation voltage, further coupled to said control terminal of said high side switch, further receiving the input voltage, and generating the high side drive signal,
wherein said configurable regulator is further coupled to said second terminal of said low side switch to receive the output voltage, and further receives the input voltage and a reference voltage,
wherein the indication output includes an indication signal and an inverted indication signal, and said configurable regulator includes:
a first resistor having a first terminal that receives the input voltage, and a second terminal;
a second resistor having a first terminal that receives the input voltage, and a second terminal;
a first transistor having a first terminal that is coupled to said second terminal of said first resistor, a second terminal, and a control terminal that is coupled to said second terminal of said first transistor;
a second transistor having a first terminal that is coupled to said second terminal of said second resistor, a second terminal, and a control terminal that is coupled to said control terminal of said first transistor;

a current source coupled between said second terminal of said first transistor and said second terminal of said second transistor;

a first switch having a first terminal that is coupled to said second terminal of said second transistor, a second terminal that receives the reference voltage, and a control terminal that is coupled to said loading detector to receive the indication signal; and a second switch having a first terminal that is coupled to said second terminal of said second transistor, a second terminal that is coupled to said second terminal of said low side switch to receive the output voltage, and a control terminal that is coupled to said loading detector to receive the inverted indication signal;

the regulation voltage being provided at a common node of said second resistor and said second transistor.

2. The power converter of claim 1, wherein the regulation voltage is equal to the reference voltage in magnitude when the indication output indicates that said power converter has light loading, and is smaller than the reference voltage in magnitude and greater than the output voltage in magnitude when the indication output indicates that said power converter has heavy loading.

3. The power converter of claim 1, wherein said loading detector is further coupled to said low side driver to receive the low side drive signal, further receives a clock signal, and generates the indication output based on the low side drive signal and the clock signal.

4. The power converter of claim 3, wherein:
the indication output includes an indication signal and an inverted indication signal; and
upon each falling edge of the clock signal, said loading detector causes the indication signal to be a logical complement of the low side drive signal in logic value, and causes the inverted indication signal to be identical to the low side drive signal in logic value.

5. The power converter of claim 3, wherein the indication output includes an indication signal and an inverted indication signal, and said loading detector includes:
a first inverter having an input terminal that is coupled to said low side driver to receive the low side drive signal, and an output terminal;
a second inverter having an input terminal that receives the clock signal, and an output terminal; and
a D flip-flop having a data input terminal that is coupled to said output terminal of said first inverter, a clock input terminal that is coupled to said output terminal of said second inverter, a data output terminal that is coupled to said configurable regulator and that provides the indication signal, and an inverting data output terminal that is coupled to said configurable regulator and that provides the inverted indication signal.

6. A power converter comprising:
a high side switch having a first terminal that receives an input voltage, a second terminal that is adapted to be coupled to an inductor, and a control terminal that receives a high side drive signal;
a low side switch having a first terminal that is coupled to said second terminal of said high side switch, a second terminal that is adapted to be coupled to a load and that provides an output voltage, and a control terminal that receives a low side drive signal;
a low side driver coupled to said control terminal of said low side switch, and generating the low side drive signal for receipt by said control terminal of said low side switch;

a loading detector receiving the low side drive signal and generating an indication output based on the low side drive signal;
a configurable regulator coupled to said loading detector to receive the indication output, and generating a regulation voltage based on the indication output; and
a high side driver coupled to said configurable regulator to receive the regulation voltage, further coupled to said control terminal of said high side switch, further receiving the input voltage, and generating the high side drive signal, wherein
said loading detector is further coupled to said low side driver to receive the low side drive signal, further receives a clock signal, and generates the indication output based on the low side drive signal and the clock signal,
the indication output includes an indication signal and an inverted indication signal, and
upon each falling edge of the clock signal, said loading detector causes the indication signal to be a logical complement of the low side drive signal in logic value, and causes the inverted indication signal to be identical to the low side drive signal in logic value.

7. A power converter comprising:
a high side switch having a first terminal that receives an input voltage, a second terminal that is adapted to be coupled to an inductor, and a control terminal that receives a high side drive signal;
a low side switch having a first terminal that is coupled to said second terminal of said high side switch, a second terminal that is adapted to be coupled to a load and that provides an output voltage, and a control terminal that receives a low side drive signal;
a low side driver coupled to said control terminal of said low side switch, and generating the low side drive signal for receipt by said control terminal of said low side switch;
a loading detector receiving the low side drive signal and generating an indication output based on the low side drive signal;
a configurable regulator coupled to said loading detector to receive the indication output, and generating a regulation voltage based on the indication output; and
a high side driver coupled to said configurable regulator to receive the regulation voltage, further coupled to said control terminal of said high side switch, further receiving the input voltage, and generating the high side drive signal,
wherein said loading detector is further coupled to said low side driver to receive the low side drive signal, further receives a clock signal, and generates the indication output based on the low side drive signal and the clock signal,
wherein the indication output includes an indication signal and an inverted indication signal, and said loading detector includes:
a first inverter having an input terminal that is coupled to said low side driver to receive the low side drive signal, and an output terminal;
a second inverter having an input terminal that receives the clock signal, and an output terminal; and
a D flip-flop having a data input terminal that is coupled to said output terminal of said first inverter, a clock input terminal that is coupled to said output terminal of said second inverter, a data output terminal that is coupled to said configurable regulator and that provides the indication signal, and an inverting data output terminal that is coupled to said configurable regulator and that provides the inverted indication signal.

* * * * *